United States Patent
Jang et al.

(10) Patent No.: US 10,637,060 B2
(45) Date of Patent: Apr. 28, 2020

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Woon-Suk Jang, Yongin-si (KR); Jeung-Gi Moon, Yongin-si (KR); Yu-Hyun Kim, Yongin-si (KR); Young-San Ko, Yongin-si (KR)

(73) Assignee: Samsung SDI Co., Ltd, Gyeonggi-do (KR)

( * ) Notice: Subject to any disclaimer, the term of this patent is extended or adjusted under 35 U.S.C. 154(b) by 111 days.

(21) Appl. No.: 14/709,129

(22) Filed: May 11, 2015

(65) Prior Publication Data
US 2015/0340697 A1    Nov. 26, 2015

(30) Foreign Application Priority Data

May 22, 2014    (KR) ......................... 10-2014-0061891

(51) Int. Cl.
*H01M 4/62*    (2006.01)
*H01M 4/134*   (2010.01)
(Continued)

(52) U.S. Cl.
CPC ........... *H01M 4/622* (2013.01); *H01M 4/134* (2013.01); *H01M 10/052* (2013.01);
(Continued)

(58) Field of Classification Search
CPC .... H01M 4/622; H01M 4/134; H01M 10/052; H01M 10/0568; H01M 10/0569;
(Continued)

(56) References Cited

U.S. PATENT DOCUMENTS

| 6,524,498 B1* | 2/2003 | Hata ...................... H01B 1/122 |
|---|---|---|
| | | 252/500 |
| 2005/0074669 A1* | 4/2005 | Park ..................... C09J 101/286 |
| | | 429/217 |

(Continued)

FOREIGN PATENT DOCUMENTS

| CN | 102027624 A | 4/2011 |
|---|---|---|
| JP | 11067213 A * | 3/1999 |

(Continued)

OTHER PUBLICATIONS

Bridel, J-S., et al. "Key parameters governing the reversibility of Si/Carbon/CMC electrodes for Li-ion batteries†." Chemistry of Materials 22.3 (2009): 1229-1241.*

(Continued)

*Primary Examiner* — Stewart A Fraser
(74) *Attorney, Agent, or Firm* — Knobbe Martens Olson and Bear LLP

(57) ABSTRACT

Disclosed herein is a negative electrode for a rechargeable lithium battery including a negative active material and a binder, wherein the binder includes carboxylmethyl cellulose and a styrene-butadiene rubber, and the carboxylmethyl cellulose has a weight average molecular weight of about 300,000 g/mol to about 500,000 g/mol, and a rechargeable lithium battery including the same.

12 Claims, 2 Drawing Sheets

(51) Int. Cl.
*H01M 10/052* (2010.01)
*H01M 10/0568* (2010.01)
*H01M 10/0569* (2010.01)
*H01M 4/02* (2006.01)

(52) U.S. Cl.
CPC .... *H01M 10/0568* (2013.01); *H01M 10/0569* (2013.01); *H01M 2004/027* (2013.01); *H01M 2220/30* (2013.01); *H01M 2300/0028* (2013.01)

(58) Field of Classification Search
CPC ....... H01M 2004/027; H01M 2220/30; H01M 2300/0028; Y02E 60/122
See application file for complete search history.

(56) References Cited

U.S. PATENT DOCUMENTS

| | | | | |
|---|---|---|---|---|
| 2007/0275302 | A1* | 11/2007 | Sotowa | H01M 4/0433 429/217 |
| 2011/0039163 | A1* | 2/2011 | Deguchi | H01M 4/133 429/330 |
| 2011/0117434 | A1* | 5/2011 | Ogasawara | H01M 4/131 429/223 |
| 2011/0229760 | A1* | 9/2011 | Hidaka | H01M 4/0402 429/217 |
| 2012/0148922 | A1* | 6/2012 | Takahashi | H01M 4/133 429/231.8 |
| 2013/0059205 | A1* | 3/2013 | Yamamura | H01M 4/134 429/231.8 |
| 2013/0108934 | A1* | 5/2013 | Lee | H01M 10/052 429/405 |
| 2014/0001400 | A1* | 1/2014 | Sugihara | H01M 4/62 252/182.1 |
| 2014/0065464 | A1* | 3/2014 | Masarapu | H01M 4/134 429/149 |

FOREIGN PATENT DOCUMENTS

| | | | |
|---|---|---|---|
| JP | 2002033105 A | * | 1/2002 |
| JP | 2010080297 A | * | 4/2010 |
| JP | 2013-004241 A | | 1/2013 |
| KR | 10-2003-0026815 A | | 4/2003 |
| KR | 10-2007-0094156 A | | 9/2007 |
| KR | 10-2013-0094738 A | | 8/2013 |
| WO | WO 2013-122352 A1 | | 8/2013 |

OTHER PUBLICATIONS

Machine translation of Ito et al. (JPH1167213 (A)).*
Machine translation of Hiroyuki et al. (JP 2010080297 A).*
Son, Bongki, et al. "Measurement and analysis of adhesion property of lithium-ion battery electrodes with SAICAS." ACS applied materials & interfaces 6.1 (2013): 526-531. (Year: 2013).*
Machine English translation of Ito et al. (JP 11067213 A) (Year: 1999).*
English machine translation of Maeda et al. (JP 2002033105 A) (Year: 2002).*
First Chinese Office Action dated Dec. 26, 2018 for Chinese Patent Application No. CN201510235963.4 which cites the above-identified references numbered 1-2, and which shares priority of Korean Patent Application No. KR 10-2014-0061891 with subject U.S. Appl. No. 14/709,129.
Second Chinese Office Action dated Oct. 8, 2019 for Chinese Patent Application No. 201510235963.4 which shares priority from Korean Patent Application KR 10-2015-0134735 with subject U.S. Appl. No. 14/709,129. No new references are cited in the Chinese Office Action.

* cited by examiner

NEGATIVE ELECTRODE FOR RECHARGEABLE LITHIUM BATTERY AND RECHARGEABLE LITHIUM BATTERY INCLUDING SAME

INCORPORATION BY REFERENCE TO ANY PRIORITY APPLICATIONS

This application claims priority to and the benefit of Korean Patent Application No. 10-2014-0061891 filed in the Korean Intellectual Property Office on May 22, 2014, the entire contents of which are incorporated herein by reference.

BACKGROUND

Field

The described technology generally relates to rechargeable lithium batteries.

Description of the Related Technology

Lithium rechargeable batteries have recently drawn attention as a power source for small portable electronic devices, and use an organic electrolyte. A lithium battery may have twice or more discharge voltage than a conventional battery using an alkaline aqueous solution, and accordingly have high energy density.

As for positive active materials of a rechargeable lithium battery, a lithium-transition metal oxide having a structure being capable of intercalating lithium ions, such as $LiCoO_2$, $LiMn_2O_4$, $LiNi_{1-x}Co_xO_2$ (0<x<1), and the like has generally been used. As for negative active materials, various carbon-based materials such as artificial graphite, natural graphite, and hard carbon that may intercalate and deintercalate have generally been used.

An electrode may be formed by coating slurry in which an active material, a binder, and a solvent are mixed and dispersed on a current collector and drying the same. Herein, when the slurry is coated to be greater than or equal to a predetermined level, i.e., thickness, the coating layer may have weak adherence to the current collector and thus, cause a crack on an electrode. In order to improve this problem, more binder may be included, which may deteriorate impregnation of the electrode. The deteriorated impregnation of the electrode may subsequently deteriorate battery performance such as cycle-life and the like.

SUMMARY

One of the instant embodiments is a negative electrode for a rechargeable lithium battery having improved cycle life characteristics by improving flexibility of a thick film electrode to prevent a crack and improving adherence and impregnation.

One embodiment provides a negative electrode for a rechargeable lithium battery that includes a negative active material and a binder, wherein the binder includes carboxylmethyl cellulose and a styrene-butadiene rubber, and the carboxylmethyl cellulose has a weight average molecular weight of about 300,000 g/mol to about 500,000 g/mol.

The carboxylmethyl cellulose may include a repeating unit represented by the following Chemical Formula 1 and a repeating unit represented by the following Chemical Formula 2.

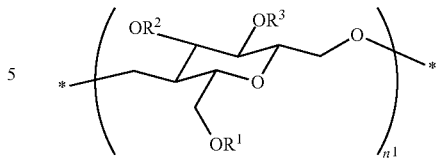

Chemical Formula 1

In the above Chemical Formula 1,
$R^1$ to $R^3$ are independently hydrogen or $-(CH_2)_{p1}-COOX^1$, and at least one of $R^1$ to $R^3$ is $-(CH_2)_{p1}-COOX^1$, wherein $p^1$ is an integer ranging from 1 to 5, and $X^1$ is an alkali metal, and
$n^1$ is an integer of greater than or equal to 600.

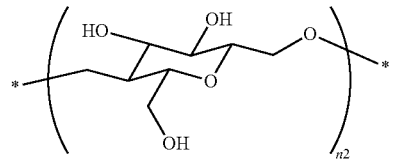

Chemical Formula 2

In the above Chemical Formula 2, and
$n^2$ is an integer of 0 to 2000.

The carboxylmethyl cellulose may have a substitution degree of a hydroxy group with a carboxylate group of about 0.5 to about 0.7.

The sum of a mole number ($n^1$) of a repeating unit represented by the above Chemical Formula 1 and a mole number ($n^2$) of a repeating unit represented by the above Chemical Formula 2 may be about 1300 to about 3000.

The carboxylmethyl cellulose may be included in an amount of about 0.4 wt % to about 2 wt % based on the total amount of the negative active material and the binder.

The glass transition temperature of the styrene-butadiene rubber may be greater than about −50° C. and less than about 20° C.

The average particle diameter (D50) of the styrene-butadiene rubber may be about 100 nm to about 250 nm.

The styrene-butadiene rubber may be included in an amount of about 0.5 wt % to about 2 wt % based on the total amount of the negative active material and the binder.

The binder may further include polyvinyl alcohol.

The polyvinyl alcohol may include a repeating unit represented by the following Chemical Formula 3.

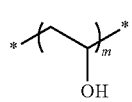

Chemical Formula 3

In the above Chemical Formula 3, m is an integer of greater than or equal to 1500.

The polyvinyl alcohol may be included in an amount of greater than about 0 wt % and less than or equal to about 0.5 wt % based on the total amount of the negative active material and the binder.

The negative active material and the binder may be included in a weight ratio of about 95:5 to about 99:1.

The loading level, a weight ratio per unit area of the negative electrode, may be greater than or equal to about 12 mg/cm², and the filling density, a weight ratio per unit volume of the negative electrode, may be greater than or equal to about 1.60 g/cc.

Another embodiment provides a rechargeable lithium battery including the negative electrode for a rechargeable lithium battery.

Another aspect provides a rechargeable lithium battery including the negative electrode; a positive electrode; and an electrolyte solution.

In the above rechargeable lithium battery, the positive electrode includes a positive active material layer. In the above rechargeable lithium battery, the electrolyte solution comprises a non-aqueous organic solvent and a lithium salt. In the above rechargeable lithium battery, the lithium salt is $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g., an integer of 1 to 20, LiCl, LiI, $LiB(C_2O_4)_2$ (lithium bis (oxalato) borate, LiBOB), or a combination thereof. In the above rechargeable lithium battery, the lithium salt is a concentration ranging from about 0.1 M to about 2.0 M. In the above rechargeable lithium battery, the non-aqueous organic solvent is selected from a carbonate-based, ester-based, ether-based, ketone-based, alcohol-based, or aprotic solvent.

Other embodiments are included in the following detailed description.

The instant rechargeable lithium battery embodiments having improved cycle life characteristics may be realized by improving flexibility of a thick film electrode to prevent a crack and also, improving adherence and impregnation.

DETAILED DESCRIPTION OF CERTAIN INVENTIVE EMBODIMENTS

Hereinafter, embodiments of the present invention are described in detail. However, these embodiments are exemplary, and this disclosure is not limited thereto.

Figure 1:
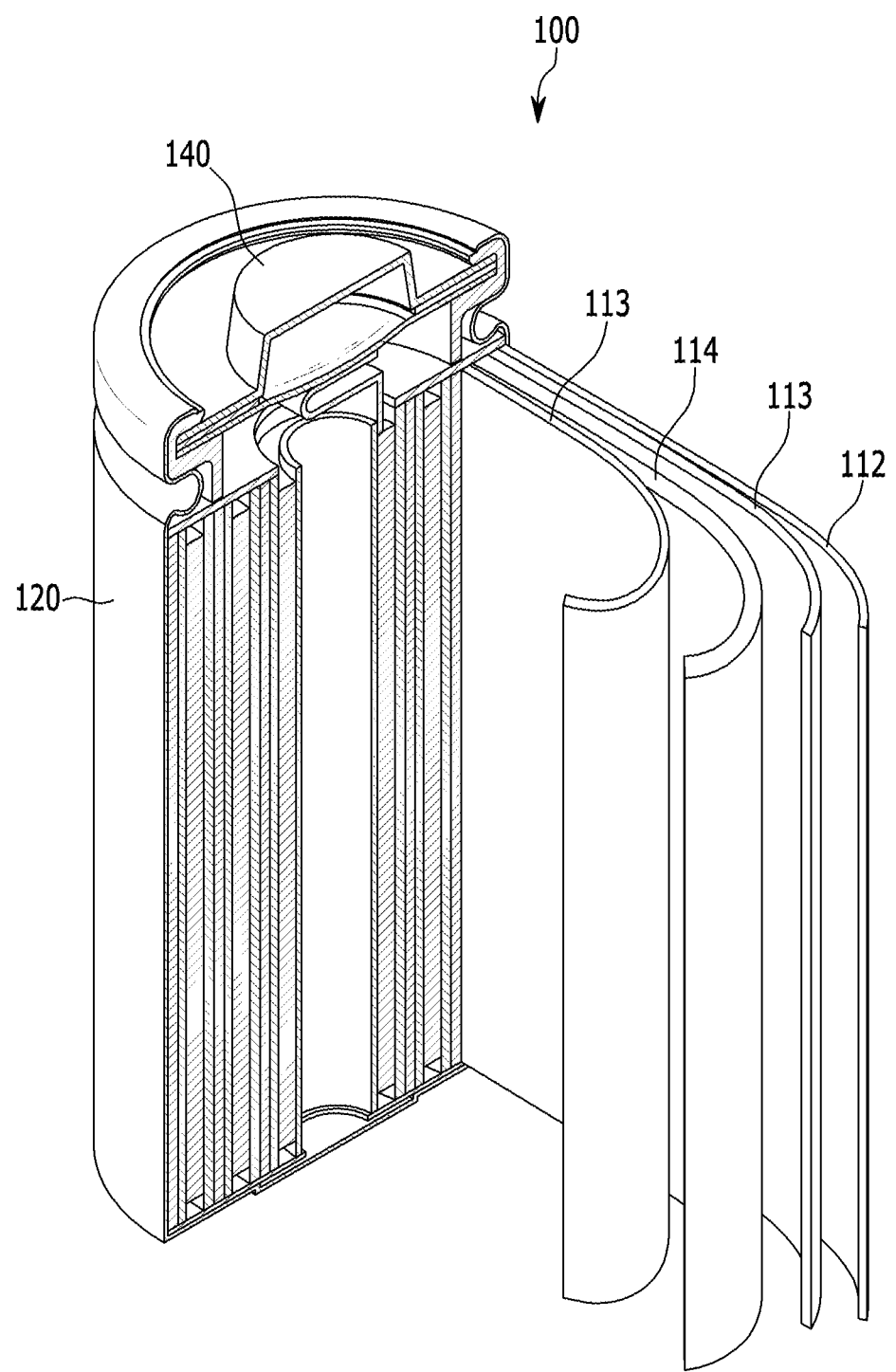
FIG. 1 is a schematic view showing a rechargeable lithium battery according to one embodiment.

FIG. 1 is a schematic view of a rechargeable lithium battery according to one embodiment.

Referring to FIG. 1, a rechargeable lithium battery 100 according to one embodiment includes a positive electrode 112, a negative electrode 114 facing the positive electrode 112, a separator 113 interposed between the negative electrode 114 and the positive electrode 112, an electrolyte (not shown) impregnating the separator 113, a battery case 120, and a sealing member 140 sealing the battery case 120.

The negative electrode includes a current collector and a negative active material layer disposed on the current collector.

According to one embodiment, the negative active material layer may be formed to have a loading level of greater than or equal to about 12 mg/cm² on one side of the current collector. As used herein, a loading level indicates a ratio of weight per unit area. In some embodiments, the negative electrode may be a thick-film electrode having a loading level of greater than or equal to about 12 mg/cm² on the cross-section. In a preferred embodiment, the negative electrode may have a loading level of about 12 mg/cm² to about 15 mg/cm². This thick-film electrode may increase capacity of a rechargeable lithium battery.

The negative active material layer may include a negative active material and a binder.

The binder may include carboxylmethyl cellulose, polyvinyl alcohol, and a styrene-butadiene rubber. In some embodiments, the binder may be obtained by mixing two or more of these materials, which may improve flexibility, adherence, and impregnation of a negative electrode, even though the negative electrode is thick.

In some embodiments, the carboxylmethyl cellulose may have a weight average molecular weight of about 300,000 g/mol to about 500,000 g/mol. In one embodiment, the carboxylmethyl cellulose may have a weight average molecular weight of about 350,000 g/mol to about 500,000 g/mol. When the carboxylmethyl cellulose has a weight average molecular weight within the above ranges, the binder has excellent adherence on the surface of a current collector and prevents generation of a crack on an electrode and thus, suppresses detachment of a negative active material during charge and discharge and resultantly, may improve cycle-life characteristics. The weight average molecular weight of the carboxylmethyl cellulose indicates a polystyrene-reduced weight average molecular weight measured through gel permeation chromatography.

The carboxylmethyl cellulose may have a structure including a repeating unit represented by the following Chemical Formula 1 and a repeating unit represented by the following Chemical Formula 2.

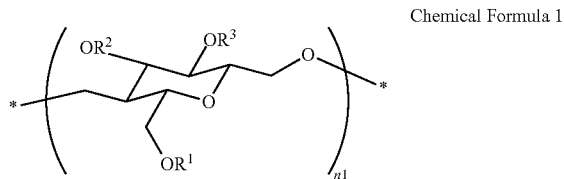

Chemical Formula 1

In the above Chemical Formula 1,
$R^1$ to $R^3$ are independently hydrogen or —$(CH_2)_{p1}$—$COOX^1$, and at least one of $R^1$ to $R^3$ is —$(CH_2)_{p1}$—$COOX^1$, wherein $p^1$ is an integer ranging from 1 to 5, and $X^1$ is an alkali metal, and
$n^1$ is an integer of greater than or equal to 600.

In the above Chemical Formula 1, $X^1$ may be an alkali metal such as Na, Ca, and the like.

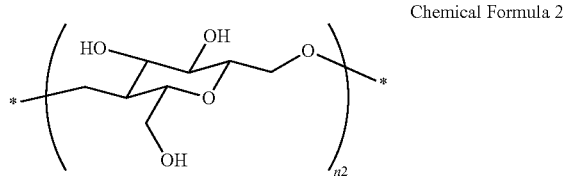

Chemical Formula 2

In the above Chemical Formula 2,
$n^2$ is an integer of 0 to 2000.

A substitution degree of the carboxylmethyl cellulose may be about 0.5 to about 0.7. As used herein, a substitution degree indicates a degree that a hydroxyl group is substituted with a carboxylate group in the molecule structure of the carboxylmethyl cellulose, i.e., a substitution degree of a hydroxyl group with a carboxylate group. Specifically, when one of three hydroxyl groups is substituted with a carboxylate group in one repeating unit, the substitution degree of the repeating unit is 1, when all three hydroxy groups are substituted with a carboxylate group, the substitution degree is 3, but when none of the three hydroxyl groups is substituted, the substitution degree is 0.

For example, the repeating unit represented by the above Chemical Formula 1 has a substitution degree of 1 to 3, since at least one of three hydroxyl groups is substituted with a carboxylate group, and the repeating unit represented by the above Chemical Formula 2 has a substitution degree of 0. In one embodiment, the substitution degree of the carboxylmethyl cellulose refers to the average value of the substitution degree of the repeating units, and the substitution degree may be controlled based on the values of n1 of Chemical Formula 1 and n2 of Chemical Formula 2. Accordingly, the substitution degree of carboxylmethyl cellulose is obtained by averaging substitution degrees of each repeating unit. In some embodiments, the carboxylmethyl cellulose including the repeating unit represented by the above Chemical Formula 1 and the repeating unit represented by the above Chemical Formula 2 may have a substitution degree of about 0.5 to about 0.7, which may be obtained by controlling the n1 and n2 of Chemical Formula 1 and Chemical Formula 2. In some embodiments, the carboxylmethyl cellulose including the repeating unit represented by the above Chemical Formula 1 and the repeating unit represented by the above Chemical Formula 2 may have a substitution degree of about 0.6 to about 0.7. Those skilled in the art would appreciate that the substitution degree of the carboxylmethyl cellulose may be optimized to improve flexibility of the thick-film electrode.

The $n^1$ of the above Chemical Formula 1, and $n^2$ of n the above Chemical Formula 2 may represent a mole number of each repeating unit in the structure of carboxylmethyl cellulose. The repeating units represented by the above Chemical Formulas 1 and 2 may be consecutively arranged but are not limited thereto, and may be variously arranged as a homo, a random, a block, and the like.

A polymerization degree of the carboxylmethyl cellulose represents a sum of a mole number ($n^1$) of a repeating unit represented by the above Chemical Formula 1 and a mole number ($n^2$) of a repeating unit represented by the above Chemical Formula 2, and may be greater than or equal to about 1300. Those skilled in the art would appreciate that the polymerization degree of the carboxylmethyl cellulose may be optimized to increase flexibility and thus, secure excellent cycle-life characteristics of a rechargeable lithium battery. Therefore, in some embodiments, the polymerization degree of the carboxylmethyl cellulose may be about 1300 to about 3000, preferably about 1300 to about 2000, and more preferably about 1500 to about 1800.

Those skilled in the art would appreciated that the amount of carboxylmethyl cellulose included may be optimized to improve the cycle-life characteristics by further improving flexibility of the thick-film electrode and thus, crack characteristics of the electrode. Therefore, in some embodiments, the carboxylmethyl cellulose may be included in an amount of about 0.4 wt % to about 2 wt %, preferably about 0.5 wt % to about 2 wt %, and more preferably about 0.5 wt % to about 1 wt % based on the total amount of the negative active material layer, i.e., based on the total amount of the negative active material and the binder.

It would be appreciated that the glass transition temperature may be optimized to improve flexibility of the thick-film electrode, thus securing excellent cycle-life characteristics of a rechargeable lithium battery. Therefore, in some embodiments, the glass transition temperature of the styrene-butadiene rubber may be greater than about −50° C. and less than about 20° C., and preferably about −20° C. to about 10° C.

It would be appreciated that the average particle diameter (D50) of the styrene-butadiene rubber may be optimized to decrease the migration of the binder and thus improve cycle-life characteristics of a rechargeable lithium battery. Therefore, in some embodiments, the average particle diameter (D50) of the styrene-butadiene rubber may be about 100 nm to about 250 nm, preferably about 130 nm to about 200 nm, and more preferably about 150 nm to about 180 nm. The average particle diameter (D50) may be measured using a particle analysis method by applying a laser diffraction method.

It would be appreciated that the amount of styrene-butadiene rubber included may be optimized to improve cycle-life characteristics and high-rate charge and discharge characteristics of a rechargeable lithium battery by improving electrical conductivity as well as flexibility of the thick-film electrode and preventing the electrode from a crack. Therefore, in some embodiments, the styrene-butadiene rubber may be included in an amount of about 0.5 wt % to about 2 wt %, preferably about 0.5 wt % to about 1.5 wt %, and more preferably about 1 wt % to about 1.5 wt % based on the total amount of the negative active material layer, i.e., based on the total amount of the negative active material and the binder.

In some embodiments, the binder may further include polyvinyl alcohol.

In some embodiments, the polyvinyl alcohol may have a structure including a repeating unit represented by the following Chemical Formula 3.

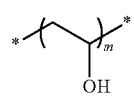

Chemical Formula 3

In the above Chemical Formula 3, m is an integer of greater than or equal to 1500.

The polyvinyl alcohol may be additionally used to improve adherence of the negative active material layer to the current collector.

In the above Chemical Formula 3, m represents the number of the repeating unit, and represents a polymerization degree of the polyvinyl alcohol. The polyvinyl alcohol having a polymerization degree of greater than or equal to about 1500 may be used to improve flexibility of the thick-film electrode and prevent the electrode from being cracked and thus, improve cycle-life characteristics of a rechargeable lithium battery. Preferably, in the above Chemical Formula 3, m may be an integer of 1500 to 3000, and more preferably about 1500 to about 2000.

It would be appreciated that the amount of polyvinyl alcohol included may be optimized to improve cycle-life characteristics and high-rate charge and discharge characteristics of a rechargeable lithium battery by improving adherence of the negative active material layer to the current collector as well as flexibility of the thick-film electrode and preventing the electrode from a crack. Therefore, in some embodiments, the polyvinyl alcohol may be included in an amount of greater than about 0 and less than or equal to about 0.5 wt %, and preferably about 0.05 wt % to about 0.3 wt % based on the total amount of the negative active material layer, i.e., based on the total amount of the negative active material and the binder.

It would be appreciated that the carboxylmethyl cellulose and the styrene-butadiene rubber may be mixed and preferably the polyvinyl alcohol may be additionally mixed to prepare a binder for manufacturing a negative electrode, to improve the cycle-life characteristics of the rechargeable lithium battery by improving flexibility of the thick-film electrode and preventing the electrode from a crack and simultaneously, improving adherence and impregnation of the electrode.

It would be appreciated that the ratio of the negative active material and the binder may be optimized to improve flexibility, adherence and impregnation of the negative electrode. Therefore, the negative active material and the binder may be included in a weight ratio of about 95:5 to about 99:1, and preferably about 97:3 to about 99:1.

The negative active material may include a material that reversibly intercalates/deintercalates lithium ions, lithium metal, lithium metal alloy, material being capable of doping and dedoping lithium, or transition metal oxide.

The material that reversibly intercalates/deintercalates lithium ions may be a carbon material which is any generally-used carbon-based negative active material rechargeable lithium battery, and examples thereof may be crystalline carbon, amorphous carbon, or a mixture thereof. Examples of the crystalline carbon may be graphite such as amorphous, sheet-shape, flake, spherical shape or fiber-shaped natural graphite or artificial graphite, and examples of the amorphous carbon may be soft carbon or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ (0<x<2), a Si—C composite, a Si-Q alloy (wherein Q is an alkali metal, an alkaline-earth metal, Group 13 to 16 elements, a transition metal, a rare earth element or a combination thereof, and not Si), Sn, $SnO_2$, a Sn—C composite, Sn—R (wherein R is an alkali metal, an alkaline-earth metal, Group 13 to 16 elements, transition metal, a rare earth element, or a combination thereof, and not Sn), and the like, and at least one of these may be mixed with $SiO_2$. Specific examples of the Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and the like.

The negative active material layer may further include a conductive material.

Any electrically conductive material may be used as a conductive material, unless it causes a chemical change. Examples thereof may be a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

The negative active material layer may be formed on the current collector, and the current collector may be a copper foil.

The negative electrode may be manufactured by mixing the negative active material, the binder, and optionally the conductive material in a solvent to prepare a negative active material composition, and applying the negative active material composition on the negative current collector. The solvent includes water, but is not limited thereto.

It would be appreciated that the filling density may be optimized to improve flexibility, adherence, and impregnation. Therefore, in some embodiments, the negative electrode may have a filling density, that is, a weight ratio per a unit volume of greater than or equal to about 1.60 g/cc and preferably, about 1.60 g/cc to about 1.80 g/cc.

Further provided herein is a rechargeable lithium battery including the negative electrode; a positive electrode; and an electrolyte solution. The positive electrode may include a current collector and a positive active material layer disposed on the current collector.

The current collector may use aluminum, but is not limited thereto.

The positive active material layer may include a positive active material.

The positive active material may use a compound (lithiated intercalation compound) capable of intercalating and deintercalating lithium, and preferably lithium metal oxide.

The lithium metal oxide may be an oxide of at least one metal selected from cobalt, manganese, nickel, and aluminum, and lithium. In some embodiments, the compounds represented by one of the following chemical formulae may be used.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2+\alpha}T_2$ (0.90≤a≤1.8, 0≤b≤0.5, 0≤c≤0.05, 0<α≤2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $LiQS_2$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$ In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; J is selected from V, Cr, Mn, Co, Ni, Cu, and a combination thereof.

The positive active material layer may further include a binder and a conductive material.

The binder may improve the binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Any electrically conductive material may be used as a conductive material, unless it causes a chemical change. Examples thereof may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

The electrolyte solution may include a non-aqueous organic solvent and a lithium salt.

The non-aqueous organic solvent may serve as a medium for transmitting ions taking part in the electrochemical reaction of a battery. The non-aqueous organic solvent may be selected from a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

When the linear carbonate compounds and cyclic carbonate compounds are mixed, an organic solvent having a high dielectric constant and a low viscosity may be provided. The cyclic carbonate and the linear carbonate are mixed together in a volume ratio ranging from about 1:1 to about 1:9.

In addition, the ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, and the like. The ether solvent may be, for example, dibutylether, tetraglyme, diglyme, dimethoxyethane, 2-methyltetrahydrofuran, tetrahydrofuran, and the like, and the ketone-based solvent may be cyclohexanone, and the like. In addition, the alcohol-based solvent may be ethanol, isopropyl alcohol, and the like.

The non-aqueous organic solvent may be used singularly or in a mixture, and when the organic solvent is used in a mixture, the mixture ratio may be controlled in accordance with a desirable battery performance.

The non-aqueous electrolyte may further include an overcharge inhibitor additive such as ethylene carbonate, pyrocarbonate, or the like.

In some embodiments, the lithium salt is dissolved in an organic solvent, supplies lithium ions in a battery, basically operates the rechargeable lithium battery, and/or improves lithium ion transportation between positive and negative electrodes therein.

Examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g., an integer of 1 to 20, LiCl, LiI, $LiB(C_2O_4)_2$ (lithium bis(oxalato) borate, LiBOB), or a combination thereof.

The concentration of the lithium salt may be optimized to improve the performance and mobility of the electrolyte due to optimal electrolyte conductivity and viscosity. Therefore, in some embodiments, the lithium salt may be used in a concentration ranging from about 0.1 M to about 2.0 M.

The separator may include any materials commonly used in the conventional lithium battery as long as separating the negative electrode from the positive electrode and providing a transporting passage for lithium ion. In some embodiments, the separator may have a low resistance to ion transportation and an excellent impregnation for an electrolyte. For example, it may be selected from glass fiber, polyester, polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

Examples 1 to 6 and Comparative Examples 1 to 5

Graphite, carboxylmethyl cellulose (carboxylmethyl cellulose sodium, CMC-Na) having a weight average molecular weight and a substitution degree provided in the following Table 1, and a styrene-butadiene rubber (SBR) having an average particle diameter (D50) provided in the following Table 1 were added to water as a solvent in a weight ratio provided in the following Table 1, preparing slurry. The slurry was coated on a copper foil and dried and then, roll-pressed, manufacturing a negative electrode having a loading level provided in the following Table 1.

$LiCoO_2$, polyvinylidene fluoride (PVdF) and carbon black in a weight ratio of 97.5:1.25:1.25 were added to N-methylpyrrolidone (NMP) as a solvent, preparing slurry. The slurry was coated on an aluminum (Al) thin film and dried and then, roll-pressed, manufacturing a positive electrode.

Ethylene carbonate, ethylmethyl carbonate and dimethyl carbonate were mixed in a volume ratio of 2:4:4, and 1.15 M of $LiPF_6$ was added to the mixed solvent, preparing an electrolyte solution.

The negative and positive electrodes and the electrolyte solution were used along with a polyethylene separator, manufacturing a rechargeable lithium battery cell.

TABLE 1

|  | Weight ratio of graphite:CMC-Na:SBR | Loading level (mg/cm$^2$) | Filling density (g/cc) | Weight average molecular weight of CMC (g/mol) | Substitution degree of CMC | Polymerization degree of CMC | Tg of SBR (° C.) | Average particle diameter of SBR (D50, nm) |
|---|---|---|---|---|---|---|---|---|
| Example 1 | 98:1:1 | 13 | 1.65 | 350,000 | 0.61 | 1800 | −10 | 170 |
| Example 2 | 97.5:1:1.5 | 13 | 1.65 | 350,000 | 0.61 | 1800 | −10 | 170 |

TABLE 1-continued

|  | Weight ratio of graphite:CMC-Na:SBR | Loading level (mg/cm$^2$) | Filling density (g/cc) | Weight average molecular weight of CMC (g/mol) | Substitution degree of CMC | Polymerization degree of CMC | Tg of SBR (° C.) | Average particle diameter of SBR (D50, nm) |
|---|---|---|---|---|---|---|---|---|
| Example 3 | 98:1:1 | 13 | 1.65 | 300,000 | 0.67 | 1400 | −10 | 130 |
| Example 4 | 97.5:1.5:1 | 13 | 1.65 | 350,000 | 0.61 | 1800 | −10 | 170 |
| Example 5 | 97.5:1:1.5 | 13 | 1.65 | 340,000 | 0.67 | 1650 | −10 | 170 |
| Example 6 | Weight ratio of graphite:CMC-Na:SBR:PVA 98:1:0.8:0.2 | 13 | 1.65 | 350,000 | 0.61 | 1800 | −10 | 170 |
| Comparative Example 1 | 98:1:1 | 13 | 1.65 | 150,000 | 1.30 | 500 | −10 | 170 |
| Comparative Example 2 | 97.5:1:1.5 | 13 | 1.65 | 280,000 | 0.80 | 1180 | −10 | 170 |
| Comparative Example 3 | 98:1:1 | 13 | 1.65 | 230,000 | 1.00 | 1000 | −10 | 170 |
| Comparative Example 4 | 98:1:1 | 13 | 1.65 | 290,000 | 0.68 | 1280 | −10 | 170 |
| Comparative Example 5 | 98:1:1 | 13 | 1.65 | 280,000 | 0.69 | 1200 | −10 | 170 |

In Table 1, the weight average molecular weight of the CMC-Na indicates a polystyrene-reduced weight average molecular weight measured through gel permeation chromatography.

In Table 1, the substitution degree of the CMC-Na indicates an average substitution degree of a repeating unit represented by Chemical Formula 1 and another repeating unit represented by Chemical Formula 2.

In Table 1, the polymerization degree of the CMC-Na indicates the sum of n$^1$ in Chemical Formula 1 and n$^2$ in Chemical Formula 2.

In Table 1, the average particle diameter (D50) of the SBR was measured using a powder measurement by applying a laser diffraction method.

In Table 1, the PVA indicates polyvinyl alcohol having m=1800 in Chemical Formula 3.

Evaluation 1: Adherence of Negative Electrode

Adherence of the negative electrodes according to Examples 1 to 6 and Comparative Examples 1 to 5 was evaluated in the following method, and the results are provided in the following Table 2.

The adherence was evaluated with a universal tester by attaching the negative active material layer formed on the copper foil to a tape and then, peeling the negative active material layer off therefrom at a peeling angle of 180° and at a speed of 50 mm/min.

Evaluation 2: Crack Generation of Negative Electrode

Whether a crack was generated in the negative electrodes according to Examples 1 to 6 and Comparative Examples 1 to 5 was evaluated in the following method, and the results are provided in the following Table 2.

After once folding each negative electrode back and forth, whether a crack and a pin hole were generated or not was examined. Herein, when a crack was found, it was marked as a crack, but where no crack but a fine pinhole was found, it was marked as a pinhole.

TABLE 2

|  | Adhesion strength (gf/mm) | Crack |
|---|---|---|
| Example 1 | 0.85 | ⊚ |
| Example 2 | 1.30 | ⊚ |
| Example 3 | 0.70 | ○ |
| Example 4 | 0.90 | ⊚ |
| Example 5 | 1.20 | ○ |
| Example 6 | 1.25 | ○ |
| Comparative Example 1 | 0.30 | X |
| Comparative Example 2 | 0.50 | Δ |
| Comparative Example 3 | 0.65 | X |
| Comparative Example 4 | 0.60 | X |
| Comparative Example 5 | 0.45 | X |

— Crack evaluation criteria:
⊚; no crack and no detachment of an active material during slitting,
○; no crack,
Δ; pinhole,
X; crack Referring to Table 2, the rechargeable lithium battery cells including a thick-film electrode having a loading level of greater than or equal to 12 mg/cm$^2$ by using a binder prepared by using carboxylmethyl cellulose having a weight average molecular weight ranging from 300,000 to 500,000 g/mol and styrene-butadiene rubber according to Examples 1 to 6 showed a minimum crack as well as excellent adherence to a current collector compared with the rechargeable lithium battery cells according to Comparative Examples 1 to 5. Accordingly, a rechargeable lithium battery cell having excellent cycle-life characteristics may be realized.

Evaluation 3: Cycle-Life Characteristics of Rechargeable Lithium Battery Cell

Figure 2:
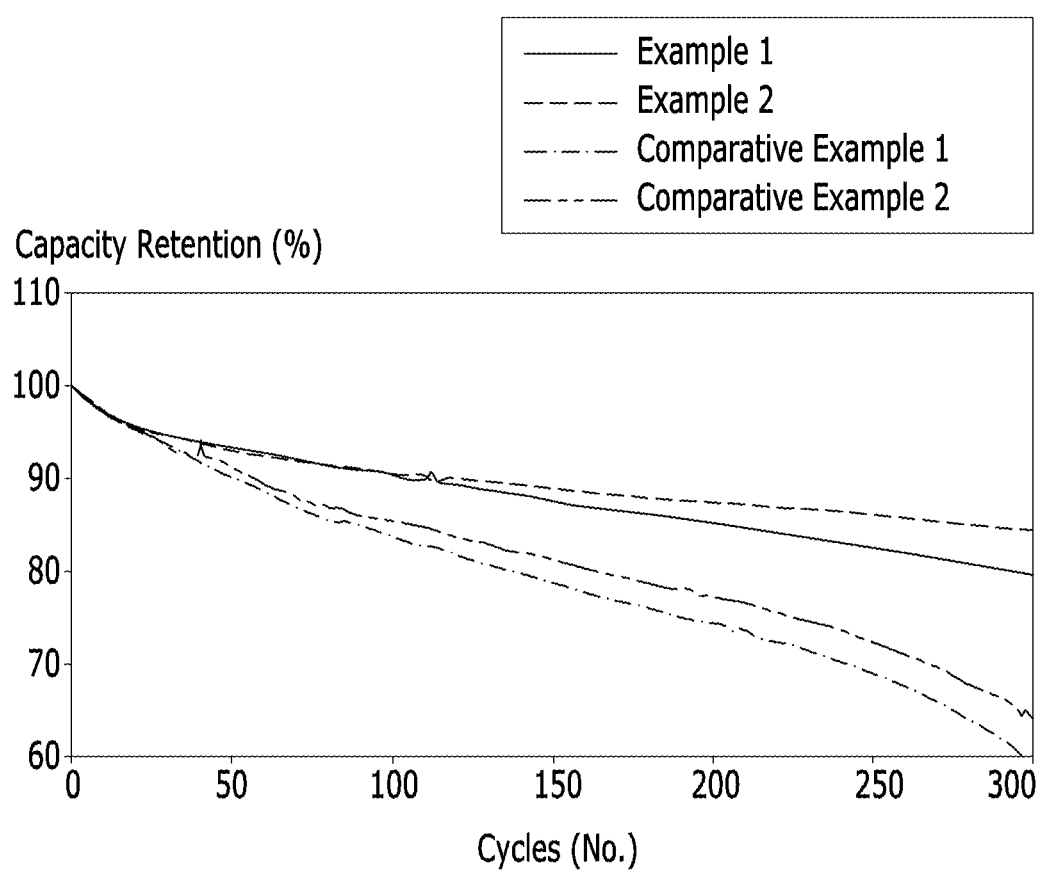
FIG. 2 is a graph showing cycle-life characteristics of the rechargeable lithium battery cells according to Examples 1 and 2 and Comparative Examples 1 and 2.

The rechargeable lithium battery cells according to Examples 1 and 2 and Comparative Examples 1 and 2 were 300 cycles charged and discharged under the following condition to evaluate their cycle-life characteristics, and the results are provided in FIG. 2.

Charge: CC-CV mode, 4.35V, 0.5 C, 0.05 C cut-off
Discharge: CC mode, 0.5 C, 3.0V cut-off FIG. 2 is a graph showing cycle-life characteristics showing the rechargeable lithium battery cells according to Example 1 and Comparative Example 1.

Referring to FIG. 2, the rechargeable lithium battery cells including a thick-film electrode having a loading level of 12 mg/cm$^2$ by using a binder prepared by mixing carboxylmethyl cellulose having a weight average molecular weight ranging from 300,000 to 500,000 g/mol and the styrene-butadiene rubber according to Examples 1 and 2 showed excellent cycle-life characteristics compared with the rechargeable lithium battery cells according to Comparative Examples 1 and 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative electrode for a rechargeable lithium battery, comprising:
    a negative active material and a binder, wherein the negative active material and the binder are included in a weight ratio of 97.5:2.5 to 98:2,
    wherein the binder comprises carboxymethyl cellulose and a styrene-butadiene rubber, and
    the carboxymethyl cellulose has a weight average molecular weight of 300,000 g/mol to 350,000 g/mol,
    wherein the average particle diameter (D50) of the styrene-butadiene rubber is 150 nm to 180 nm,
    wherein the carboxymethyl cellulose comprises a repeating unit represented by the following Chemical Formula 1 and a repeating unit represented by the following Chemical Formula 2:

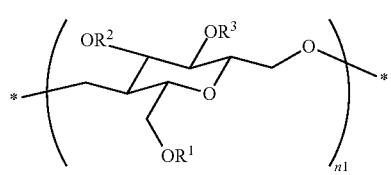

Chemical Formula 1 wherein,
$R^1$ to $R^3$ are independently hydrogen or —$(CH_2)_{p1}$—$COOX^1$, and at least one of $R^1$ to $R^3$ is —$(CH_2)_{p1}$—$COOX^1$, wherein $p^1$ is an integer ranging from 1 to 5, and $X^1$ is Na, and
mole number ($n^1$) is an integer of greater than or equal to 600,

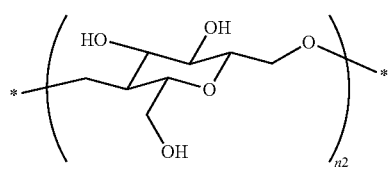

Chemical Formula 2 wherein mole number ($n^2$) is an integer of 0 to 2000,
wherein the carboxymethyl cellulose has a substitution degree of a hydroxyl group with a carboxylate group of 0.6 to 0.7,
wherein the sum of the mole number ($n^1$) of the repeating unit represented by the Chemical Formula 1 and the mole number ($n^2$) of the repeating unit represented by the Chemical Formula 2 is 1650 to 1800,
wherein the carboxymethyl cellulose is included in an amount of 0.4 wt % to 2 wt % based on the total amount of the negative active material and the binder,
wherein the styrene-butadiene rubber is included in an amount of 1 wt % to 1.5 wt % based on the total amount of the negative active material and the binder,
wherein the loading level of the negative electrode is 12 mg/cm$^2$ to 15 mg/cm$^2$, and
wherein the filling density of the negative electrode is 1.60 g/cc to 1.80 g/cc.

2. The negative electrode of claim 1, wherein the carboxymethyl cellulose has a substitution degree of a hydroxyl group with a carboxylate group of 0.67.

3. The negative electrode of claim 1, wherein the glass transition temperature of the styrene-butadiene rubber is greater than −50° C. and less than 20° C.

4. The negative electrode of claim 1, wherein the binder comprises polyvinyl alcohol.

5. The negative electrode of claim 4, wherein the polyvinyl alcohol comprises a repeating unit represented by the following Chemical Formula 3:

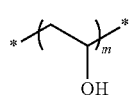

Chemical Formula 3 wherein m is an integer of greater than or equal to 1500.

6. The negative electrode of claim 4, wherein the polyvinyl alcohol is included in an amount of greater than 0 wt % and less than or equal to 0.5 wt % based on the total amount of the negative active material and the binder.

7. A rechargeable lithium battery, comprising
the negative electrode of claim 1;
a positive electrode; and
an electrolyte solution.

8. The rechargeable lithium battery of claim 7, wherein the positive electrode comprises a positive active material layer.

9. The rechargeable lithium battery of claim 7, wherein the electrolyte solution comprises a non-aqueous organic solvent and a lithium salt.

10. The rechargeable lithium battery of claim 9, wherein the lithium salt is LiPF$_6$, LiBF$_4$, LiSbF$_6$, LiAsF$_6$, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$), wherein, x and y are natural numbers, LiCl, LiI, LiB(C$_2$O$_4$)$_2$ (lithium bis(oxalato) borate, LiBOB), or a combination thereof.

11. The rechargeable lithium battery of claim 9, wherein the lithium salt is a concentration ranging from 0.1 M to 2.0 M.

12. The rechargeable lithium battery of claim 9, wherein the non-aqueous organic solvent is selected from a carbonate-based, ester-based, ether-based, ketone-based, alcohol-based, or aprotic solvent.

* * * * *